(12) United States Patent
Oda et al.

(10) Patent No.: US 9,714,621 B2
(45) Date of Patent: Jul. 25, 2017

(54) AUTOMATIC ENGINE CONTROL APPARATUS

(71) Applicant: TOYOTA JIDOSHA KABUSHIKI KAISHA, Toyota-shi, Aichi-ken (JP)

(72) Inventors: Yasutaka Oda, Nagoya (JP); Hirokazu Kato, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/071,636

(22) Filed: Mar. 16, 2016

(65) Prior Publication Data

US 2016/0290264 A1 Oct. 6, 2016

(30) Foreign Application Priority Data

Mar. 31, 2015 (JP) .................................. 2015-074369

(51) Int. Cl.
*F02D 41/04* (2006.01)
*F02N 11/08* (2006.01)
(Continued)

(52) U.S. Cl.
CPC ......... *F02D 41/042* (2013.01); *F02D 41/065* (2013.01); *F02D 41/26* (2013.01); *F02N 11/0818* (2013.01); *F02N 11/0825* (2013.01); *F02D 2200/602* (2013.01); *F02N 11/0822* (2013.01); *F02N 11/0829* (2013.01); *F02N 2200/08* (2013.01); *F02N 2200/0801* (2013.01);
(Continued)

(58) Field of Classification Search
CPC .. F02D 41/042; F02D 41/065; F02N 11/0818; F02N 11/0825
USPC ............................ 123/179.4, 179.3; 701/112
See application file for complete search history.

(56) References Cited

U.S. PATENT DOCUMENTS

| 8,788,178 B2 * | 7/2014 | Pebley .................. F02N 11/084 701/101 |
| 2010/0152995 A1 * | 6/2010 | Baumann ............ F02N 11/0814 701/112 |

(Continued)

FOREIGN PATENT DOCUMENTS

| EP | 2492121 A1 | 8/2012 |
| JP | H06-317197 A | 11/1994 |

(Continued)

*Primary Examiner* — Mahmoud Gimie
(74) *Attorney, Agent, or Firm* — Oliff PLC (57) ABSTRACT

An automatic engine control apparatus installed in a vehicle causes an engine of the vehicle to stop automatically when a predetermined stop condition is satisfied, and after the automatic stop of the engine, causes the engine to restart automatically when a predetermined restarting condition is satisfied. The apparatus includes an electronic control unit configured to inhibit or permit, while the vehicle is stopped, a second automatic stop of the engine in response to the predetermined stop condition being satisfied, depending on whether the predetermined restarting condition satisfied most recently to have caused the engine to restart automatically was a first restarting condition or a second restarting condition different from the first restarting condition. The first restarting condition represents an intention of a driver of the vehicle to start moving the vehicle.

7 Claims, 7 Drawing Sheets

| RESTART CONDITION | WHETHER TO PERMIT ENGINE TO STOP AGAIN | ELAPSED TIME AFTER ENGINE RESTART | RESTART COUNT |
|---|---|---|---|
| AIR CONDITIONING REQUIREMENT | PERMITTED | TA | Y |
| BATTERY REQUIREMENT | PERMITTED | TB | Y |
| SHIFT OPERATION REQUIREMENT | PERMITTED | TC | Y |
| STEERING OPERATION REQUIREMENT | NOT PERMITTED | – | – |
| ACCELERATION OPERATION REQUIREMENT | NOT PERMITTED | – | – |
| BRAKING OPERATION REQUIREMENT | PERMITTED | TD | Y |
| SS CANCELING SW REQUIREMENT | PERMITTED | TE | Y |
| DIAGNOSTIC DETECTION REQUIREMENT | NOT PERMITTED | – | – |
| ... | ... | ... | ... |

(51) Int. Cl.
 *F02D 41/06* (2006.01)
 *F02D 41/26* (2006.01)
(52) U.S. Cl.
 CPC ......... *F02N 2200/0805* (2013.01); *F02N 2200/0807* (2013.01); *F02N 2200/101* (2013.01); *F02N 2200/102* (2013.01); *F02N 2200/104* (2013.01); *F02N 2200/124* (2013.01); *Y02T 10/48* (2013.01)

(56) References Cited

U.S. PATENT DOCUMENTS

| | | | |
|---|---|---|---|
| 2010/0229815 A1 | 9/2010 | Senda et al. | |
| 2013/0245925 A1* | 9/2013 | Malone | F02N 11/0818 701/113 |
| 2015/0211468 A1* | 7/2015 | Ezumi | F02N 11/0825 701/112 |

FOREIGN PATENT DOCUMENTS

| | | |
|---|---|---|
| JP | 2000-018060 A | 1/2000 |
| JP | 2010-209864 A | 9/2010 |
| JP | 2012-102647 A | 5/2012 |
| JP | 2013-064344 A | 4/2013 |
| JP | 2013-064345 A | 4/2013 |
| JP | 2014-208500 A | 11/2014 |
| JP | 2015-048895 A | 3/2015 |

* cited by examiner

| RESTART CONDITION | WHETHER TO PERMIT ENGINE TO STOP AGAIN | ELAPSED TIME AFTER ENGINE RESTART | RESTART COUNT |
|---|---|---|---|
| AIR CONDITIONING REQUIREMENT | PERMITTED | TA | Y |
| BATTERY REQUIREMENT | PERMITTED | TB | Y |
| SHIFT OPERATION REQUIREMENT | PERMITTED | TC | Y |
| STEERING OPERATION REQUIREMENT | NOT PERMITTED | — | — |
| ACCELERATION OPERATION REQUIREMENT | NOT PERMITTED | — | — |
| BRAKING OPERATION REQUIREMENT | PERMITTED | TD | Y |
| SS CANCELING SW REQUIREMENT | PERMITTED | TE | Y |
| DIAGNOSTIC DETECTION REQUIREMENT | NOT PERMITTED | — | — |
| ⋮ | ⋮ | ⋮ | ⋮ |

| RESTART CONDITION | WHETHER TO PERMIT ENGINE TO STOP AGAIN ||
|---|---|---|
| | VEHICLE SPEED>0 | VEHICLE SPEED=0 |
| · BRAKING OPERATION REQUIREMENT<br>· ROAD SURFACE SLOPE REQUIREMENT<br>· BRAKE NEGATIVE PRESSURE REQUIREMENT<br>· BRAKE MASTER CYLINDER REQUIREMENT | NOT PERMITTED | PERMITTED |
| · STEERING OPERATION REQUIREMENT | PERMITTED | NOT PERMITTED |
| · DIAGNOSTIC DETECTION REQUIREMENT | NOT PERMITTED | NOT PERMITTED |
| · SS CANCELING SW REQUIREMENT | PERMITTED | PERMITTED |
| ... | ... | ... |

AUTOMATIC ENGINE CONTROL APPARATUS

CROSS REFERENCE TO RELATED APPLICATION

The present application is based on and claims the benefit of priority of Japanese Priority Application No. 2015-074369, filed on Mar. 31, 2015, the entire contents of which are hereby incorporated by reference.

FIELD

The disclosures herein generally relate to an automatic engine control apparatus that is installed in a vehicle.

BACKGROUND

Conventionally, a system has been known that executes start-and-stop control to have the engine of a vehicle stop automatically if a predetermined stop condition is satisfied, and then, to have the engine restart automatically if a predetermined restarting condition is satisfied (see, for example, Japanese Laid-open Patent Publication No. 2000-18060). In such a system, once the engine has been stopped and then restarted automatically, if the predetermined stop condition is satisfied, the engine is stopped automatically again.

However, inconvenience may arise if the engine is stopped automatically again in response to the predetermined stop condition being satisfied after the engine has been stopped and then restarted automatically. Specifically, for example, if the restarting condition that has been satisfied is a requirement about an acceleration operation or a requirement about a steering operation, it is highly likely that the driver is preparing to start from a stopped state of the vehicle. In this case, contrary to the driver's intention, the engine is stopped automatically in response to the satisfied predetermined stop condition being satisfied after having the engine restart automatically.

SUMMARY

According to an embodiment, an automatic engine control apparatus installed in a vehicle, configured to have an engine of the vehicle stop automatically when a predetermined stop condition is satisfied, and after automatically stopping the engine, to have the engine restart automatically when a predetermined restarting condition is satisfied, includes an electronic control unit configured to inhibit, while the vehicle is stopped, a second automatic stop of the engine in response to the predetermined stop condition being satisfied when the predetermined restarting condition satisfied most recently to have caused the engine to restart automatically was a first restarting condition, or to permit the second automatic stop of the engine in response to the predetermined stop condition being satisfied when the predetermined restarting condition satisfied most recently to have caused the engine to restart automatically was a second restarting condition different from the first restarting condition. The first restarting condition represents an intention of a driver of the vehicle to start moving the vehicle.

Note that "predetermined stop conditions" in the embodiment do not include a condition based on an elapsed time after having the engine restart, and do not include a condition based on the number of times of restarting the engine. Also, "permitting to have the engine stop automatically" includes permitting to have the engine stop automatically only if the elapsed time after having the engine restart is greater than or equal to a predetermined time, and the number of times of restarting the engine is less than a predetermined number of times.

DESCRIPTION OF EMBODIMENTS

In the following, specific embodiments of the automatic engine control apparatus will be described with reference to the drawings.

First Embodiment

Figure 1:
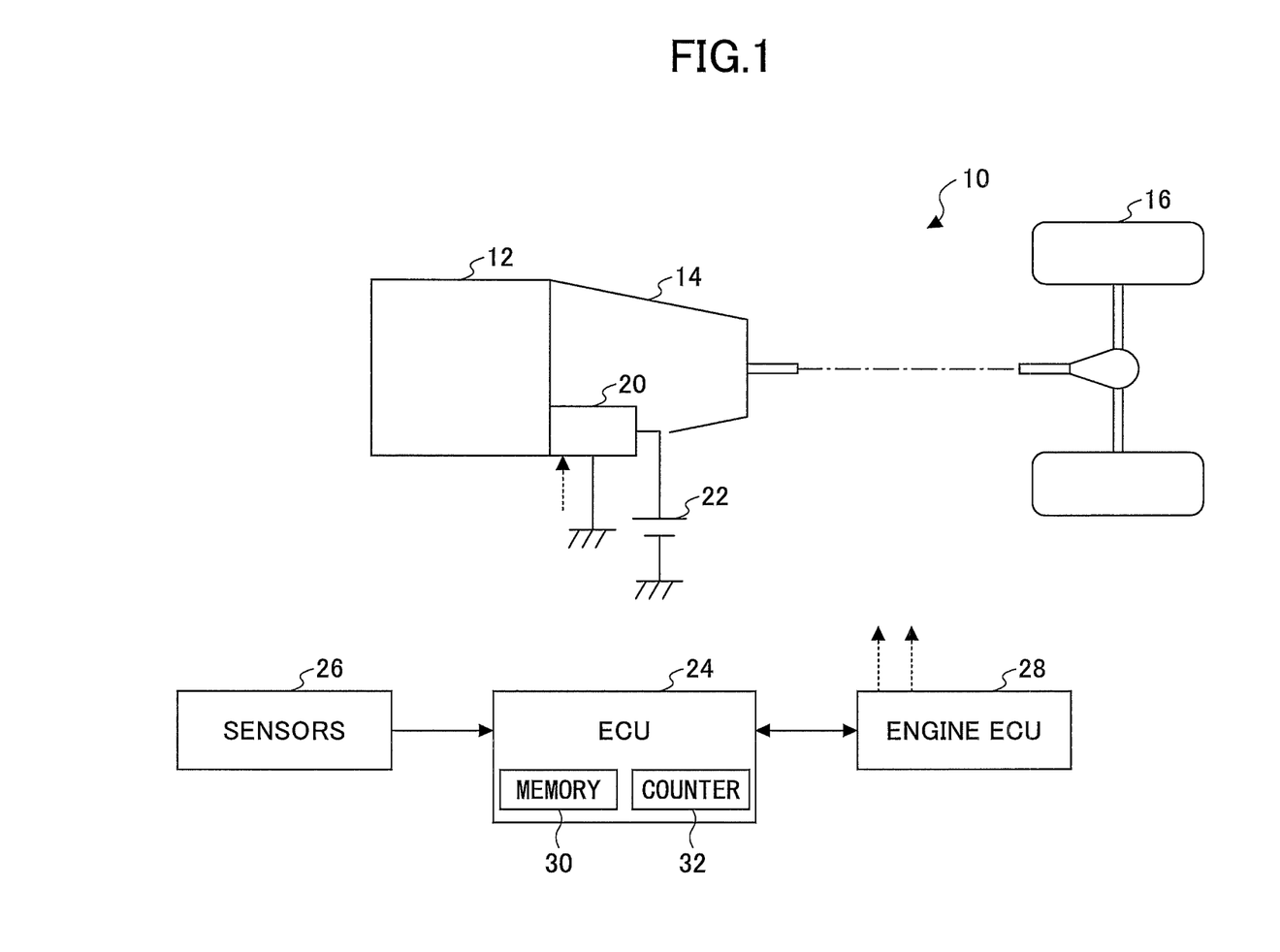
FIG. 1 is a configuration diagram of an automatic engine control apparatus according to a first embodiment.

FIG. 1 is a configuration diagram of an automatic engine control apparatus 10 according to a first embodiment.

The automatic engine control apparatus 10 in the embodiment is installed in a vehicle having an engine 12. The engine 12 is an internal combustion engine to generate motive power by combusting fuel such as gasoline and light oil. The motive power generated by the engine 12 is transferred to driving wheels 16 via a transmission 14.

The engine 12 has an engine starter 20 attached to the engine 12. The engine starter 20 is a device to be cranked by using electric energy accumulated in a battery 22, to have the engine 12 start. The engine 12 is started by cranking by the engine starter 20. Note that the battery 22 is installed in the vehicle to output DC power, and is charged by power generated by rotational drive of the engine 12.

The automatic engine control apparatus 10 can execute start-and-stop control (S&S control), which also may be referred to as "idling stop control", or "economical running control". The S&S control has the engine 12 stop automatically if predetermined engine stop conditions are satisfied, and after the automatic stop of the engine, has the engine 12 restart automatically if a predetermined engine restarting condition is satisfied. The automatic engine control apparatus 10 can execute the S&S control based on predetermined engine stop conditions that include at least stoppage of the vehicle (referred to as the "stoppage S&S control" below).

The predetermined engine stop conditions include that, for example, a predetermined pedaling operation is performed on the brake pedal (brake pedal on); a predetermined pedal-releasing operation is performed on the accelerator pedal (accelerator pedal off); the shift lever of transmission 14 is positioned at the neutral mode or the parking mode; the charged state of the battery is better than or equal to a predetermined state; the air conditioner in the compartment is turned off; the vehicle is stopped (the vehicle speed is zero); the electric load is less than or equal to a predetermined value; the brake master cylinder pressure is greater than or equal to a predetermined pressure; a diagnosis is not detected; the cancel switch of the S&S control, which can be operated by an occupant of the vehicle, is not turned on, and if all of the conditions are satisfied, stopping the engine may be executed.

Also, the predetermined engine restarting conditions include that, for example, a predetermined pedal-releasing operation is performed on the brake pedal (brake pedal off); a predetermined pedaling operation is performed on the accelerator pedal (accelerator pedal on); the steering wheel is operated by an angle greater than or equal to a predetermined angle; a shift operation is performed on the shift lever of transmission 14, especially, a shift operation to the drive mode or the reverse mode; a clutch operation is performed on the transmission 14, especially, a clutch releasing operation; the slope of a road on which the vehicle is traveling is greater than or equal to a predetermined slope (for example, 15°); the negative pressure of the brake booster is shifted on the atmospheric pressure side with respect to a predetermined negative pressure; the charged state of the battery is reduced to be less than or equal to a predetermined state; the air conditioner in the compartment is operating; the electric load has increased to be greater than a predetermined value; the brake master cylinder pressure is less than a predetermined pressure; a diagnosis is detected; the cancel switch of the S&S control, which can be operated by an occupant of the vehicle, is turned on, and if any one of the conditions is satisfied, restarting the engine may be executed.

The automatic engine control apparatus 10 includes an electronic control unit (ECU) 24 that is mainly configured with a microcomputer. The ECU 24 includes a CPU to execute a program, a ROM to store programs and data, a RAM to temporarily store data, and input/output ports that are connected with various sensors and actuators.

The ECU 24 receives as input data that is required for determining whether the engine stop conditions and the restarting conditions for the stoppage S&S control are satisfied. Sensors and switches (referred to as the "sensors" below) 26 that output such data include a vehicle speed sensor to detect the vehicle speed V; a brake pedal sensor to detect whether a pedaling operation is being performed on the brake pedal, opening of the pedaling operation, and the pedaling force; an accelerator opening sensor to detect a stepping amount on the accelerator pedal and opening of the pedaling operation; a shift position sensor to detect the position of the shift lever; a battery sensor to detect a charging or discharging current and the terminal voltage of the battery; the air conditioner to control air conditioning in the compartment; a master cylinder pressure sensor to detect the brake master cylinder pressure; and the cancel switch of the S&S control.

The ECU 24 is connected with an engine control computer (referred to as the "engine ECU" below) 28 that controls accessories such as the engine starter 20 and fuel injection valves. The ECU 24 executes the S&S control to have the engine 12 stop automatically and restart automatically by issuing commands to the engine ECU 28, based on signals from the various sensors 26.

Next, with reference to FIG. 2 and FIG. 3, operations of the automatic engine control apparatus 10 in the embodiment will be described.

Figure 2:
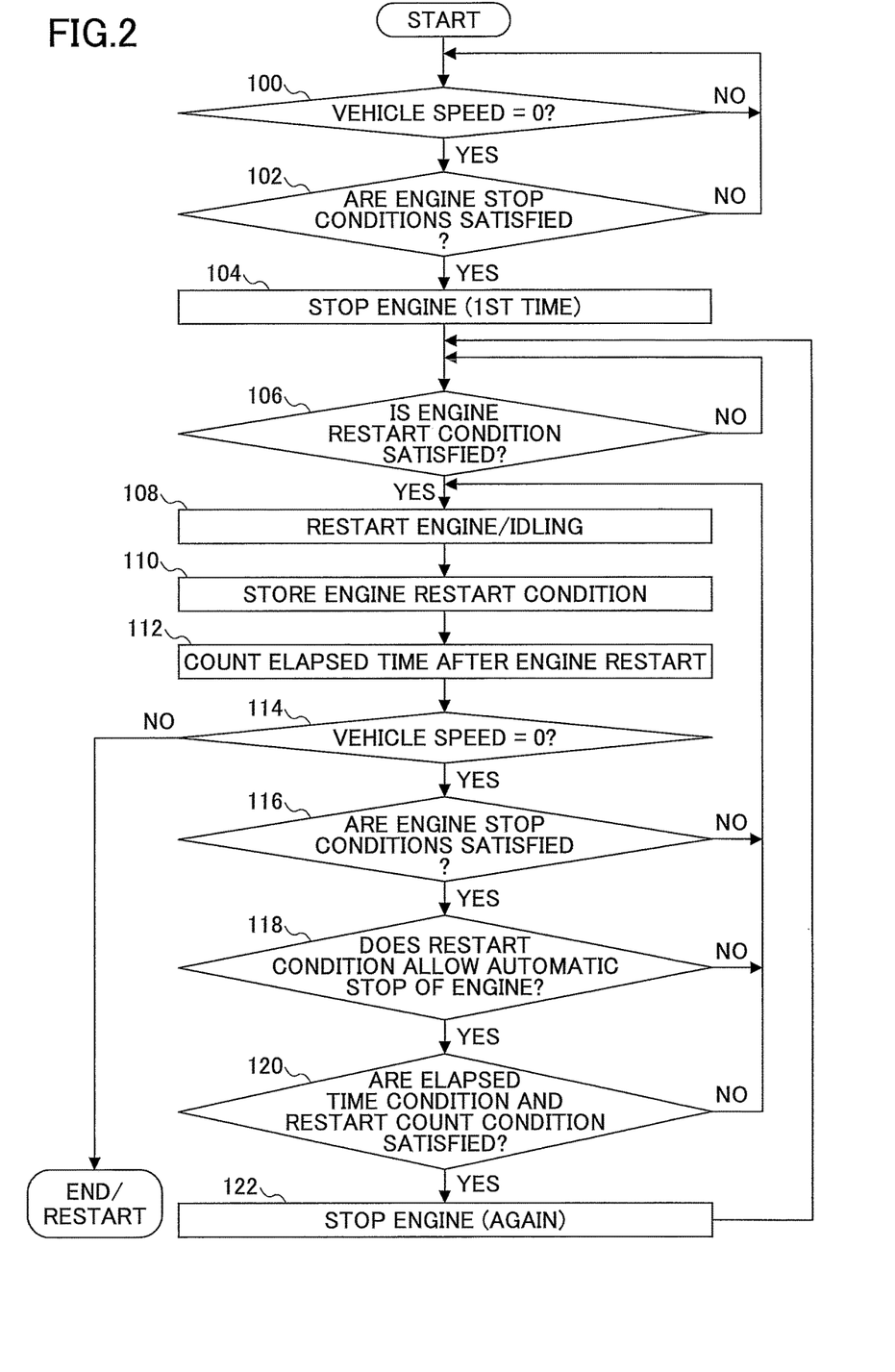
FIG. 2 is a flowchart of an example of a control routine executed in the automatic engine control apparatus according to the embodiment.

FIG. 2 is a flowchart of an example of a control routine executed by the ECU 24 in the automatic engine control apparatus 10 in the embodiment. In the automatic engine control apparatus 10 in the embodiment, the ECU 24 starts executing the routine illustrated in FIG. 2 by having the CPU execute a program after the power switch of the vehicle has been turned on.

The ECU 24 first determines whether the engine stop conditions of the stoppage S&S control are satisfied, specifically first determines whether the vehicle speed is zero, namely whether the vehicle is stopped (Step 100). Then, if determining that the vehicle speed is zero, the ECU 24 determines whether the engine stop conditions other than that the vehicle speed is zero (referred to as the "other engine stop conditions" below) are satisfied (Step 102).

If determining at Step 100 that the vehicle speed is not zero, or if determining at Step 102 that the other engine stop conditions are not satisfied, the ECU 24 determines that the engine stop conditions of the stoppage S&S control are not satisfied, and executes Step 100 again (specifically, the step to determine whether the vehicle speed is zero).

On the other hand, if determining at Step 100 that the vehicle speed is zero, and if determining at Step 102 that the other engine stop conditions are satisfied, the ECU 24 determines that the engine stop conditions of the stoppage S&S control are satisfied, and starts executing the stoppage S&S control. Specifically, the ECU 24 issues a command to the engine ECU 28 to have the engine 12 stop automatically (Step 104). Note that this automatic stop command is a first automatic stop command that has been issued after the power switch of the vehicle has been turned on and the vehicle has been stopped. In response to the automatic stop command, the engine ECU 28 issues a command to stop operations to the accessories such as the engine starter 20 and the fuel injection valves, to have the engine 12 stop automatically.

After having the engine 12 stop automatically as described above, the ECU 24 determines whether the engine restarting condition of the stoppage S&S control is satisfied (Step 106). As a result, if determining that the engine restarting condition is not satisfied, the ECU 24 executes Step 106 repeatedly. On the other hand, if determining that the engine restarting condition is satisfied, the ECU 24 terminates the stoppage S&S control. Specifically, the ECU 24 issues a command to the engine ECU 28 to have the engine 12 restart automatically (Step 108). In response to the automatic restart command, the engine ECU 28 issues a command to start operations to the accessories such as the engine starter 20 and the fuel injection valves, to have the engine 12 restart automatically, and then, to have the engine 12 transition to an idling state.

Having had the engine 12 restart automatically at Step 108, the ECU 24 has a memory 30 store the engine restarting condition that has been satisfied when having the engine 12 restart automatically (Step 110). For example, if having the engine 12 restart automatically upon the predetermined pedal releasing operation performed on the brake pedal, the ECU 24 has the memory 30 store the brake pedal operation as the engine restarting condition. Also, using a counter 32, the ECU 24 starts counting to measure the elapsed time after having the engine 12 restart automatically at Step 108 (Step 112).

After having the engine 12 restart automatically as described above, the ECU 24 determines whether the vehicle speed is zero, namely, whether the vehicle is stopped (Step 114). Consequently, if determining that the vehicle speed is not zero, the ECU 24 terminates the current routine without executing any further steps. On the other hand, if determining that the vehicle speed is zero, then, the ECU 24 determines whether the engine stop conditions other than that the vehicle speed is zero are satisfied (Step 116).

If determining at Step 116 that the other engine stop conditions are not satisfied, the ECU 24 determines that the engine stop conditions of the stoppage S&S control are not satisfied, and executes Step 108 (specifically, the step to have the engine 12 continue the idling state).

On the other hand, if determining at Step 116 that the other engine stop conditions are satisfied, then, the ECU 24 reads the restarting condition satisfied most recently to have the engine 12 restart automatically (the latest engine restarting condition) that has been stored in the memory 30, and determines whether the latest engine restarting condition (the cause of the restart) to have the engine 12 restart automatically at Step 108 is one of those conditions that permit to have the engine 12 stop automatically (Step 118).

Figure 3:
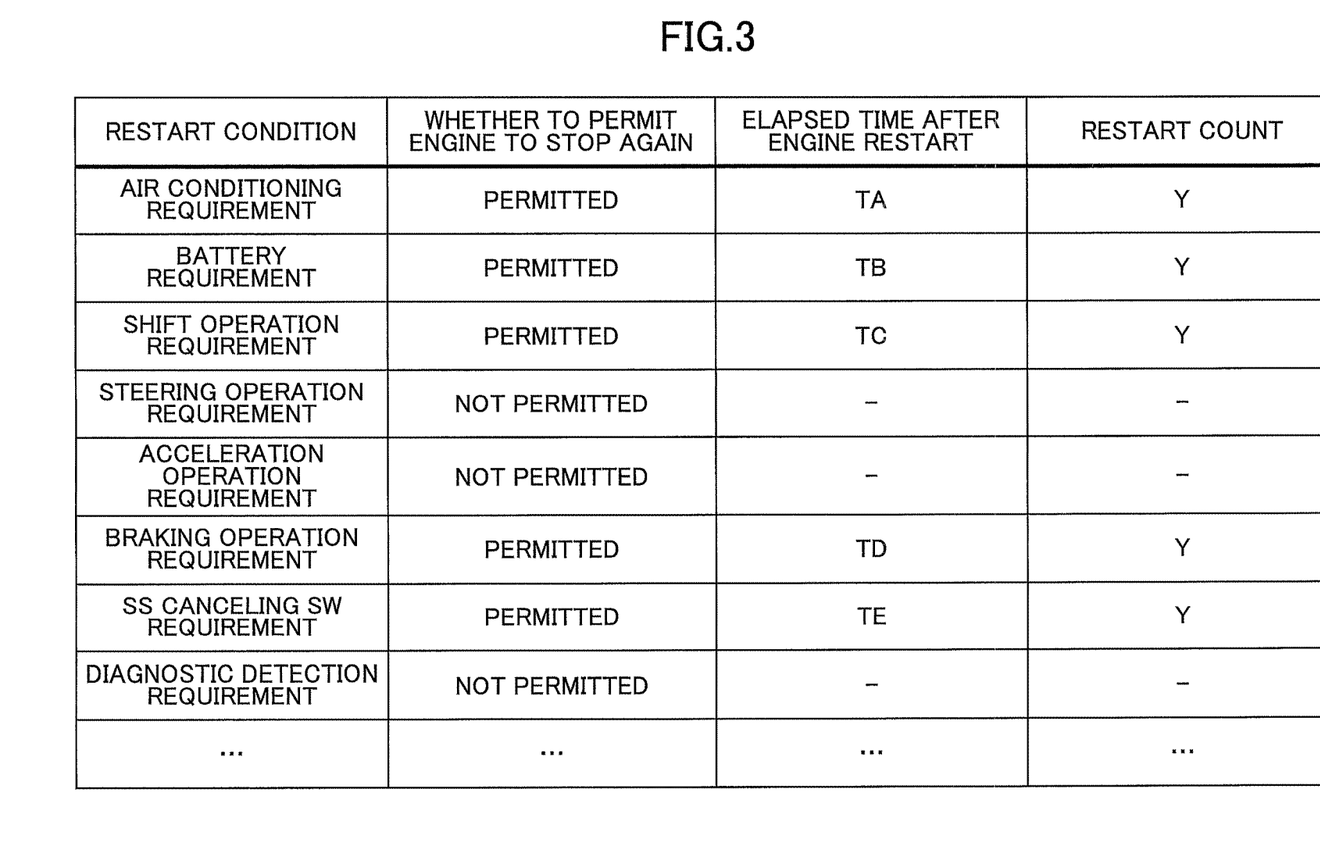
FIG. 3 is an example of a table used in the automatic engine control apparatus in the embodiment that represents, for each engine restarting condition, whether to stop the engine automatically again after a latest automatic engine restart; a longest elapsed time to inhibit the engine from being stopped automatically again after the latest automatic engine restart; and the number of times of automatic engine restarting while the vehicle is stopped, which is also a minimum number of times of restarting to inhibit the engine from being stopped automatically again.

FIG. 3 is an example of a table used in the automatic engine control apparatus 10 in the embodiment that represents, for each of the engine restarting conditions, whether to stop the engine automatically again after the latest automatic engine restart; a longest elapsed time to inhibit the engine from being stopped automatically again after the latest automatic engine restart; and the number of times of automatic engine restarting while the vehicle is stopped, which is also a minimum number of times of restarting to inhibit the engine from being stopped automatically again.

In the automatic engine control apparatus 10 in the embodiment, for each of the restarting conditions to have the engine 12 restart, it is defined in advance whether to permit to have the engine 12 stop automatically again (referred to as the "secondary automatic engine stop" below) after having the engine 12 restart automatically in response to the restarting condition being satisfied. In addition, for each of the restarting conditions that permit the secondary automatic engine stop after the latest automatic engine restart, it is defined in advance a longest elapsed time from the latest automatic engine restart during which the secondary automatic engine stop is inhibited after the automatic engine restart executed in response to the restarting condition being satisfied (the longest elapsed time after restarting). Furthermore, for each of the restarting conditions that permit the secondary automatic engine stop after the latest automatic engine restart, it is defined in advance the number of times of automatic engine restarting while the vehicle is stopped, which is also a minimum number of times of restarting to inhibit the secondary automatic engine stop (a minimum number of restarting times).

For example, as illustrated in FIG. 3, among the restarting conditions, a requirement to be satisfied based on an air-conditioning state (air conditioning requirement), a requirement to be satisfied based on a state of the battery 22 (battery requirement), a requirement to be satisfied based on an operation on the shift lever (shift operation requirement), a requirement to be satisfied based on an operation on the brake pedal (brake pedal operation requirement), and a requirement to be satisfied based on the cancel switch of the S&S control (cancel switch requirement) are defined as restarting conditions that permit the secondary automatic engine stop after a latest automatic engine restart.

Also, among the restarting conditions, a requirement to be satisfied based on an operation on the steering wheel (steering operation requirement), a requirement to be satisfied based on an operation on the accelerator pedal (accelerator pedal operation requirement), and a requirement to be satisfied based on a detection of a diagnosis (diagnosis detection requirement) are defined as restarting conditions to inhibit the secondary automatic engine stop.

Also, as illustrated in FIG. 3, the longest elapsed times after restarting of the restarting conditions that permit the secondary automatic engine stop after a latest automatic engine restart, are times TA, TB, TC, TD, and TE, for the air conditioning requirement, the battery requirement, the shift operation requirement, the brake pedal operation requirement, and the cancel switch requirement of the S&S control, respectively, and in this order. Note that the longest elapsed times after restarting TA, TB, and TC for the air conditioning requirement, the battery requirement, and the shift operation requirement, respectively, may be set comparatively longer; and the longest elapsed times after restarting TD and TE for the brake pedal operation requirement, and the cancel switch requirement of the S&S control, respectively, may be set comparatively shorter. Also, these longest elapsed times after restarting may be set different from each other depending on the restarting conditions.

Furthermore, as illustrated in FIG. 3, the minimum numbers of restarting times of the restarting conditions that permit the secondary automatic engine stop after a latest automatic engine restart are set to the same number of times Y. Note that the minimum numbers of restarting times of the restarting conditions that permit the secondary automatic engine stop after a latest automatic engine restart may be set different from each other depending on the restarting conditions.

In the embodiment, the ECU 24 stores information representing the relationship as illustrated in FIG. 3 in the ROM in advance. With reference to the relationship as illustrated in FIG. 3, the ECU 24 determines whether a restarting condition satisfied most recently to have the engine 12 restart automatically at Step 118, is one of the restarting conditions that permit the secondary automatic engine stop.

If determining that the restarting condition satisfied most recently to have the engine 12 restart automatically at Step 118, is not any of the restarting conditions that permit the secondary automatic engine stop, the ECU 24 executes Step 108 (specifically, the step to have the engine 12 continue the idling state).

On the other hand, if determining that the restarting condition satisfied most recently to have the engine 12 restart automatically at Step 118, is one of the restarting conditions that permit the secondary automatic engine stop, the ECU 24 determines whether the elapsed time after having the engine 12 restart automatically most recently, is greater than or equal to the longest elapsed time after restarting defined for the latest restarting condition that permits the secondary automatic engine stop, and the number of times of engine restarting counted with the latest automatic restart of the engine 12 while the vehicle is stopped, is less than the minimum number of restarting times defined for the latest restarting condition that permits the secondary automatic engine stop (Step 120).

If the elapsed time after having the engine 12 restart automatically most recently, is less than the longest elapsed time after restarting defined for the latest restarting condition that permits the secondary automatic engine stop, or the number of times of engine restarting counted with the latest automatic restart of the engine 12 while the vehicle is stopped, is greater than or equal to the minimum number of restarting times defined for the latest restarting condition that permits the secondary automatic engine stop, the secondary automatic engine stop should be inhibited. Therefore, if determining at Step 120 that the elapsed time after having the engine 12 restart automatically most recently, is less than the longest elapsed time after restarting defined for the latest restarting condition that permits the secondary automatic engine stop, or the number of times of engine restarting counted with the latest automatic restart of the engine 12 while the vehicle is stopped, is greater than or equal to the minimum number of restarting times defined for the latest restarting condition that permits the secondary automatic engine stop, the ECU 24 executes Step 108 (specifically, the step to have the engine 12 continue the idling state).

On the other hand, if the elapsed time after having the engine 12 restart automatically most recently, is greater than or equal to than the longest elapsed time after restarting defined for the latest restarting condition that permits the secondary automatic engine stop, and the number of times of engine restarting counted with the latest automatic restart of the engine 12 while the vehicle is stopped, is less than the minimum number of restarting times defined for the latest restarting condition that permits the secondary automatic engine stop, the secondary automatic engine stop should be executed. Therefore, if determining at Step 120 that the elapsed time after having the engine 12 restart automatically most recently, is greater than or equal to the longest elapsed time after restarting defined for the latest restarting condition that permits the secondary automatic engine stop, and the number of times of engine restarting counted with the latest automatic restart of the engine 12 while the vehicle is stopped, is less than the minimum number of restarting times defined for the latest restarting condition that permits the secondary automatic engine stop, the ECU 24 terminates the stoppage S&S control. Specifically, the ECU 24 issues a command to the engine ECU 28 to have the engine 12 stop automatically (Step 122). Note that this automatic stop command is a second automatic stop command or a later one issued after the power switch of the vehicle has been turned on and the vehicle has been stopped.

In response to the automatic stop command issued for the second time or later, the engine ECU 28 issues a command to stop operations to the accessories such as the engine starter 20 and the fuel injection valves, to have the engine 12 stop automatically. After having the engine 12 stop automatically as described above, the ECU 24 determines whether the engine restarting condition of the stoppage S&S control is satisfied at Step 106.

In this way, the automatic engine control apparatus 10 in the embodiment can permit or inhibit the secondary automatic engine stop in response to the engine stop conditions being satisfied while the vehicle is stopped, depending on a restarting condition to have the engine 12 restart automatically, satisfied after having had the engine 12 stop automatically by executing the stoppage S&S control with the engine stop conditions previously satisfied.

In other words, the automatic engine control apparatus 10 can inhibit the secondary automatic engine stop in response to the engine stop conditions being satisfied, if the satisfied restarting condition to have the engine 12 restart automatically, is one of the specific restarting conditions (specifically, the steering operation requirement, the accelerator pedal operation requirement, and the diagnosis detection requirement) among the restarting conditions.

Alternatively, the automatic engine control apparatus 10 can permit the secondary automatic engine stop in response to the engine stop conditions being satisfied, if the satisfied restarting condition to have the engine 12 restart automatically, is a restarting condition other than the specific restarting conditions (specifically, the air conditioning requirement, the battery requirement, the shift operation requirement, the brake pedal operation requirement, and the cancel switch requirement of the S&S control) among the restarting conditions.

If the satisfied restarting condition to have the engine 12 restart automatically, is the steering operation requirement or the accelerator pedal operation requirement, it can be determined that the driver is preparing to start the vehicle from a stop state, and has an intention to start the vehicle by having the engine 12 transition to an idling state. In this case, if the secondary automatic engine stop is executed in response to the engine stop conditions being satisfied after the automatic engine restart, the engine is stopped, contrary to the driver's intention. Also, if the satisfied restarting condition to have the engine 12 restart automatically, is the diagnosis detection requirement, and the secondary automatic engine stop is executed in response to the engine stop conditions being satisfied after the automatic engine restart, then, it may be impossible to have the engine 12 restart, depending on the cause of the diagnosis detection (for example, a disconnection), and traveling safety may be reduced.

In contrast to this, in the embodiment, the automatic engine control apparatus 10 can inhibit the secondary automatic engine stop in response to the engine stop conditions being satisfied while the vehicle is stopped, if the restarting condition to have the engine 12 restart automatically that is satisfied most recently is one of the specific restarting conditions (specifically, the steering operation requirement, the accelerator pedal operation requirement, or the diagnosis detection requirement). In other words, the automatic engine control apparatus 10 can inhibit the secondary automatic engine stop in response to the engine stop conditions being satisfied, irrespective of the longest elapsed time after restarting, and irrespective of the number of times of engine restarting while the vehicle is stopped.

Therefore, the automatic engine control apparatus 10 in the embodiment can prevent the engine 12 from being stopped automatically again, after having the engine 12 stopped automatically, and then, while the vehicle is stopped, having the engine 12 restart automatically with a satisfied one of the specific restarting conditions. Therefore, it is possible to avoid executing the secondary automatic engine stop after having the engine 12 restart automatically while the vehicle is stopped, contrary to the driver's intention, or when a diagnosis is detected with which the engine 12 should not be stopped.

Also, in the embodiment, the automatic engine control apparatus 10 can permit the secondary automatic engine stop in response to the engine stop conditions being satisfied, if the restarting condition to have the engine 12 restart automatically that is satisfied most recently is a restarting condition other than the specific restarting conditions. For example, if the predetermined pedal releasing operation is performed on the brake pedal to have the engine 12 restart automatically, and then, the predetermined pedaling operation is performed on the brake pedal that satisfies the engine stop condition, the secondary automatic engine stop can be permitted in response to the engine stop conditions being satisfied.

If the driver has relaxed a pedaling operation on the brake pedal to have the engine 12 restart automatically, and then, steps on the brake pedal to an extent to satisfy the engine stop condition, it can be determined that the driver has an intention to stop the vehicle. Therefore, it is possible to avoid not executing the secondary automatic engine stop, contrary to the driver's intention, after having the engine 12 restart automatically, and the engine stop conditions are satisfied. Thus, the fuel efficiency improvement effect can be raised by the stoppage S&S control.

Note that in the embodiment, even if the secondary automatic engine stop is permitted after having the engine restart automatically as described above, the secondary automatic engine stop is executed only when the elapsed time after the engine restart, is greater than or equal to the longest elapsed time after restarting specified for the restarting condition, or the number of times of automatic engine restart while the vehicle is stopped is less than the minimum number of restarting times specified for the engine restarting condition.

Therefore, according to the embodiment, it is possible to avoid executing the secondary automatic engine stop at timing just after having the engine restart automatically, and it is possible to avoid frequent repetition of having the engine restart and stop automatically while the vehicle is stopped.

Also, the timing just after having the engine restart automatically during which execution of the secondary automatic engine stop is restricted, can be set for each of the restarting conditions that permit the secondary automatic engine stop, as the longest elapsed time after restarting. Also, the minimum number of restarting times with which execution of the secondary automatic engine stop is restricted, can be set for each of the restarting conditions that permit the secondary automatic engine stop. By setting the longest elapsed time after restarting and the minimum number of restarting times depending on a restarting condition, the secondary automatic engine stop after having the engine restart automatically can be executed in accordance with the satisfied restarting condition. Therefore, after having the engine restart automatically, the secondary automatic engine stop responding to the engine stop conditions being satisfied can be executed at an appropriate timing in accordance with the restarting condition.

Note that in the first embodiment, among the engine restarting conditions, the specific restarting conditions including the steering operation requirement, the accelerator pedal operation requirement, and the diagnosis detection requirement correspond to a "first restarting condition" described in the claims; among the engine restarting conditions, restarting conditions including the air conditioning requirement, the battery requirement, the shift operation requirement, the brake pedal operation requirement, and the cancel switch requirement correspond to a "second restarting condition" described in the claims; the ECU 24 not executing Step 122 after obtaining a negative determination at Step 118 in the routine illustrated in FIG. 2, and executing Step 122 after obtaining a positive determination at Step 118, corresponds to an "electronic control unit" described in the claims.

Also, in the first embodiment, the restarting conditions that inhibit the secondary automatic engine stop, and the restarting conditions that permit the secondary automatic engine stop, after a latest automatic engine restart are set as illustrated in FIG. 3. However, the embodiment is not limited to that, but other requirements may be included as restarting conditions that inhibit the secondary automatic engine stop, or as restarting conditions that permit the secondary automatic engine stop.

Second Embodiment

Figure 4:
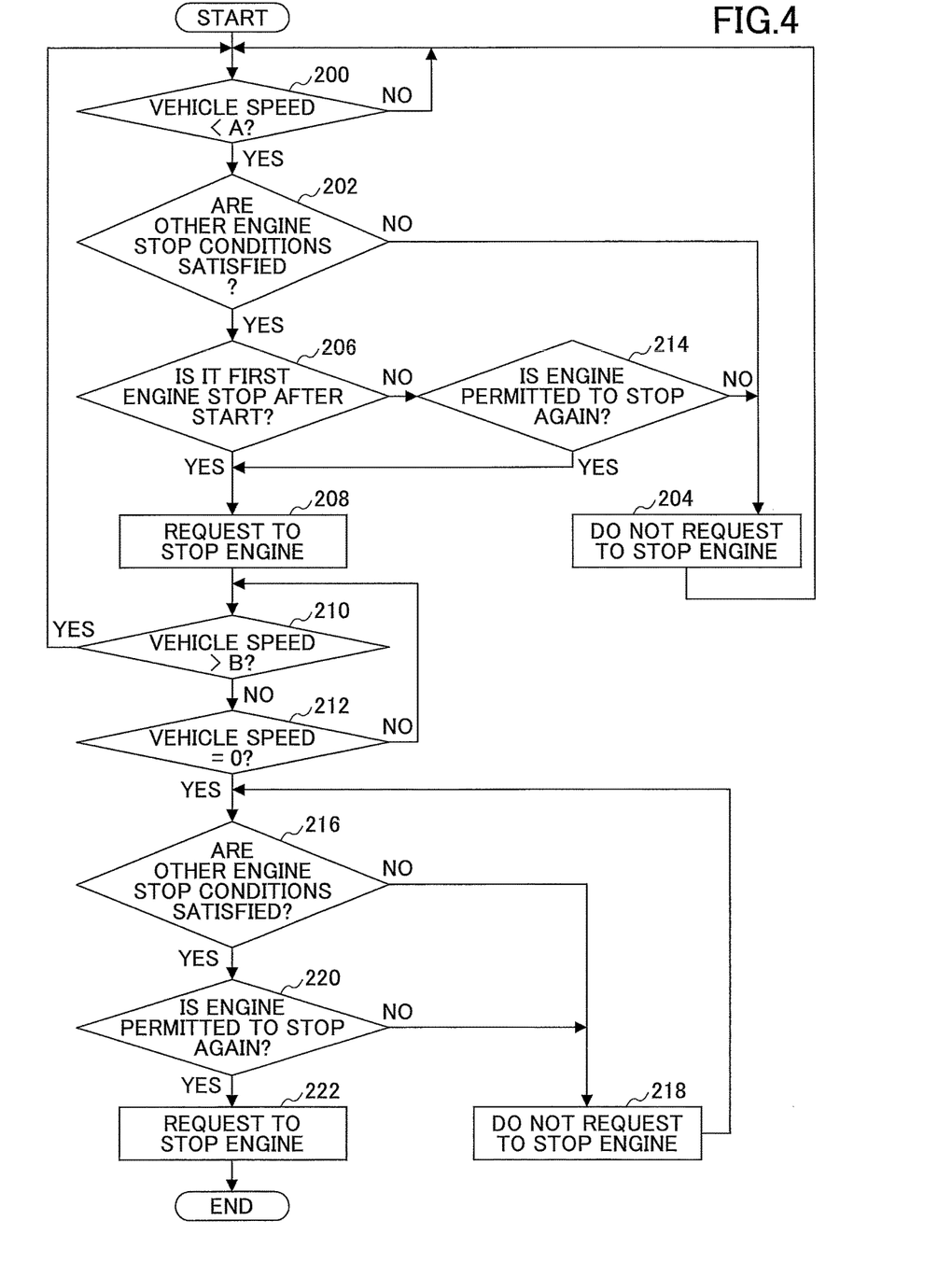
FIG. 4 is a flowchart of an example of a control routine executed in an automatic engine control apparatus according to a second embodiment.

An automatic engine control apparatus 10 according to a second embodiment is implemented by having an ECU 24 execute a routine illustrated in FIG. 4 instead of the routine illustrated in FIG. 2 in the first embodiment.

The automatic engine control apparatus 10 in the embodiment can execute so-called "deceleration S&S control" and "multi S&S control". The deceleration S&S control includes at least a predetermined engine stop condition that is satisfied if the vehicle decelerates to a predetermined speed (e.g., the vehicle speed is less than a predetermined vehicle speed such as 6 km/h). Also, the multi S&S control includes at least a predetermined engine stop condition that is satisfied if the vehicle is stopped (the vehicle speed is zero), and the elapsed time after having the engine restart automatically is greater than or equal to a predetermined time, and the number of times of engine restarting is less than a predetermined number of times while the vehicle is stopped. The automatic engine control apparatus 10 starts executing the deceleration S&S control if the condition on the predetermined vehicle deceleration is satisfied, and starts executing the multi S&S control if the condition of the vehicle stoppage is satisfied.

The engine stop conditions of the deceleration S&S control and the engine stop conditions of the multi S&S control may be equivalent to each other except for the conditions on the vehicle speed, the elapsed time after having the engine restart automatically, and the number of times of engine restarting. Note that the engine restarting conditions of the deceleration S&S control and the multi S&S control may be equivalent to each other.

Figure 5A:
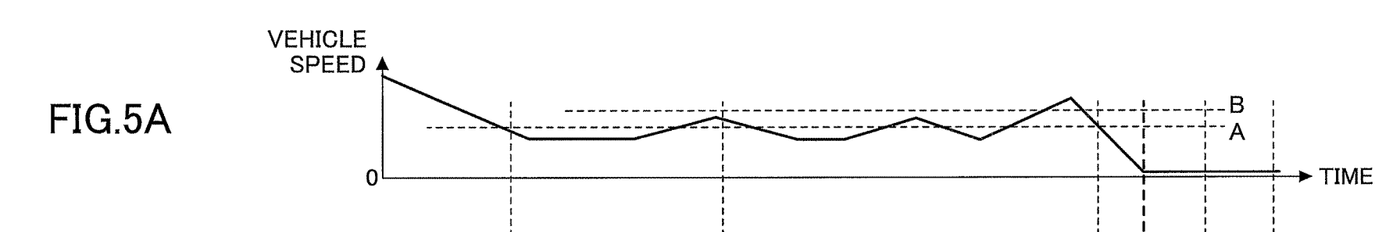
FIGS. 5A-5B are an example of an operational timing chart that is realized when controlling to have the engine stop automatically depending on the vehicle speed, in the automatic engine control apparatus according to the embodiment.
Figure 5B:
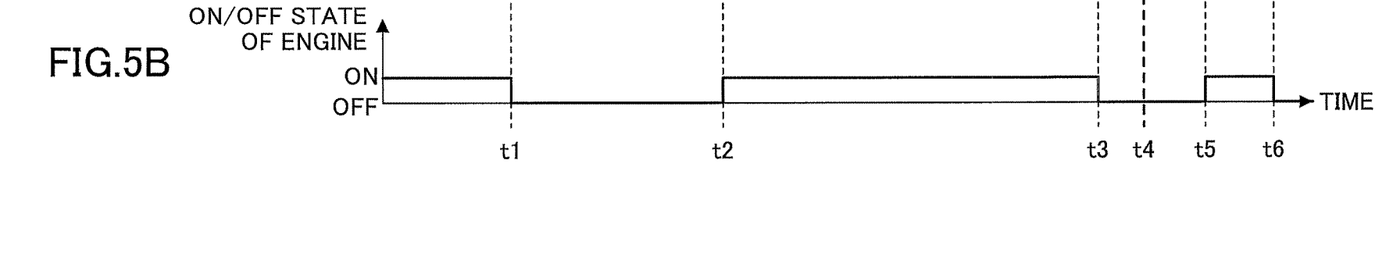

FIG. 4 is a flowchart of an example of a control routine executed by the ECU 24 in the automatic engine control apparatus 10 according to the embodiment. Also, FIGS. 5A-5B are an example of an operational timing chart that is realized when controlling to have the engine stop automatically depending on the vehicle speed, in the automatic engine control apparatus 10 according to the embodiment. Note that FIG. 5A illustrates temporal change of the vehicle speed, and FIG. 5B illustrates temporal change of on (operating) and off (stopped) of the engine 12.

In the automatic engine control apparatus 10 in the embodiment, the ECU 24 starts executing the routine illustrated in FIG. 4 by having the CPU execute a program after the power switch of the vehicle is turned on.

The ECU 24 first determines whether the engine stop conditions of the stoppage S&S control are satisfied, specifically first determines whether the vehicle speed is less than a predetermined vehicle speed A (Step 200). Note that the predetermined vehicle speed A is a lower limit of the vehicle speed at which execution of the deceleration S&S control is not permitted, for example, 6 km/h. If determining at Step 200 that the vehicle speed is greater than or equal to the predetermined vehicle speed A, the ECU 24 determines that the engine stop conditions of the deceleration S&S control are not satisfied, and executes Step 200 again.

On the other hand, if determining at Step 200 that the vehicle speed is less than the predetermined vehicle speed A, then, the ECU 24 determines whether the engine stop conditions other than that the vehicle speed is less than the predetermined vehicle speed A (referred to as the "other engine stop conditions" below) are satisfied (Step 202). Consequently, if determining that the other engine stop conditions are not satisfied, the ECU 24 determines that the engine stop conditions of the deceleration S&S control are not satisfied, and hence, does not make a request for having the engine 12 stop automatically, to the engine ECU 28 (Step 204), and executes Step 200 again.

If determining at Step 202 that the other engine stop conditions are satisfied, then, the ECU 24 determines whether the satisfied engine stop conditions including the vehicle speed requirement and the other engine stop conditions of the deceleration S&S control that are positively determined at Steps 200 and 202, may realize an automatic stop of the engine 12 for the first time after the vehicle has been started (Step 206).

If determining at Step 206 that the satisfied engine stop conditions may realize an automatic stop of the engine 12 for the first time after the vehicle has been started, the ECU 24 starts executing the deceleration S&S control. Specifically, the ECU 24 issues a command to the engine ECU 28 to have the engine 12 stop automatically (Step 208). Note that this automatic stop command is a first automatic stop command that has been issued after the power switch of the vehicle has been turned on and the vehicle has been started. In response to the automatic stop command, the engine ECU 28 issues a command to stop operations to the accessories such as the engine starter 20 and the fuel injection valves, to have the engine 12 stop automatically.

After having the engine 12 stop automatically as described above, if the engine restarting condition of the deceleration S&S control is satisfied, the ECU 24 issues a command to the engine ECU 28 to have the engine 12 restart automatically, to terminate the deceleration S&S control. In this case, the engine 12 is restarted automatically. Note that having the engine 12 restart automatically, the ECU 24 has a memory 30 store the engine restarting condition that has been satisfied when having the engine 12 restart automatically.

After having the engine 12 restart automatically after Step 208, the ECU 24 determines whether the vehicle speed is over a predetermined vehicle speed B (Step 210). Note that the predetermined vehicle speed B is a vehicle speed over which execution of the deceleration S&S control is permitted again after having the engine 12 restart automatically (the secondary automatic engine stop), and set to a value higher than the predetermined vehicle speed A (for example, 10 km/h).

If determining at Step 210 that the vehicle speed is less than or equal to the predetermined vehicle speed B, then, the ECU 24 determines whether the engine stop conditions of the multi S&S control are satisfied, specifically, first determines whether the vehicle speed is zero, namely, whether the vehicle is stopped (Step 212). If determining that the vehicle speed is not zero, the ECU 24 determines that the vehicle is traveling at speed less than or equal to the predetermined vehicle speed B, and executes Step 210 again. On the other hand, if determining that the vehicle speed is over the predetermined vehicle speed B, the ECU 24 executes Step 200 again.

After having the engine 12 stop automatically at Step 208 for the first time after the vehicle has been started, if executing Step 206 via Step 210 (the vehicle speed is over the predetermined vehicle speed B), the ECU 24 determines that the latest satisfied engine stop conditions may realize an automatic stop of the engine 12 for the second time or later, not for the first time, after the vehicle has been started. In this case, then, the ECU 24 determines whether to have the engine 12 stop automatically in response to the engine stop conditions being satisfied (Step 214). Specifically, the ECU 24 reads the restarting condition satisfied most recently to have the engine 12 restart automatically that has been stored in the memory 30, and determines whether the latest engine restarting condition (the cause of the restart) to have the engine 12 restart automatically is one of those conditions that permit to have the engine 12 stop automatically.

Therefore, to realize the automatic engine stop by the deceleration S&S control for the first time after the vehicle has been started, the vehicle speed needs to be less than the predetermined vehicle speed A. On the other hand, to realize the automatic engine stop by the deceleration S&S control for the second time or later after the vehicle has been started, the vehicle speed needs to be less than the predetermined vehicle speed A to execute a latest automatic engine stop, and then, the vehicle speed needs to be over the predetermined vehicle speed B that is greater than the predetermined vehicle speed A, and then, to be less than the predetermined vehicle speed A.

For example, while the engine 12 is operating, on which execution of the deceleration S&S control is permitted, if the vehicle speed is reduced to be less than the predetermined vehicle speed A at time t1 as illustrated in FIG. 5A, to satisfy the engine stop condition, the engine 12 is stopped automatically. Then, if any one of the engine restarting conditions is satisfied at time t2, the engine 12 is restarted automatically. After that, as long as the vehicle speed is not over the predetermined vehicle speed B, automatic stop of the engine 12 is not permitted even if the vehicle speed is less than the predetermined vehicle speed A. Once the vehicle speed is over the predetermined vehicle speed B, and the vehicle speed is then reduced to be less than the predetermined vehicle speed A at time t3, the engine 12 is stopped automatically.

Also, as illustrated in FIG. 5A, after the vehicle has been stopped at time t4, if any one of the engine restarting conditions is satisfied at time t5, the engine 12 is restarted automatically. After that, when the engine stop conditions of the multi S&S control are satisfied at time t6, the engine 12 is stopped automatically. However, this automatic engine stop is executed only if the satisfied engine restarting condition at the latest automatic engine restart is one of the conditions that permit the secondary automatic engine stop as will be described later.

Figure 6:
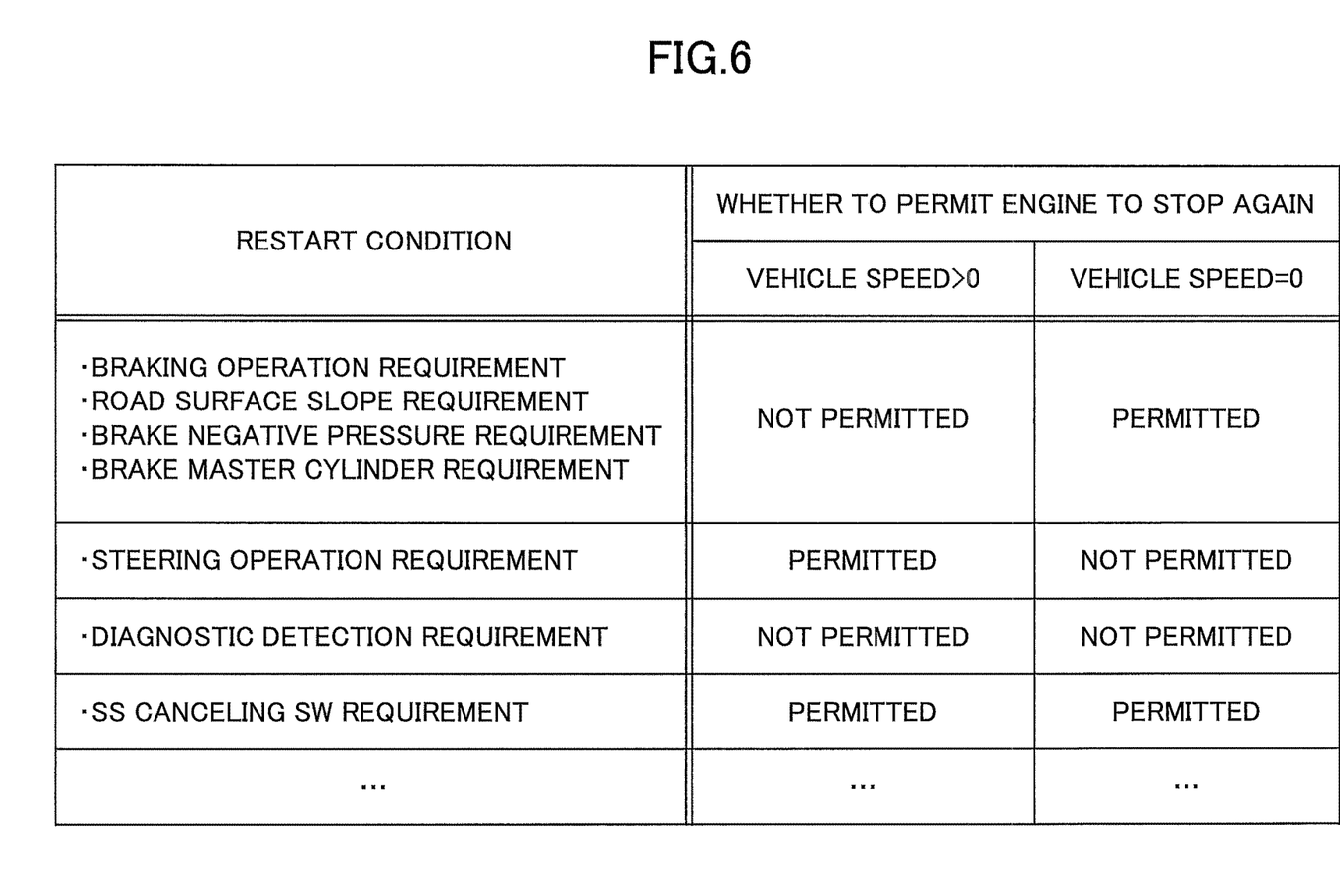
FIG. 6 is an example of a table used in the automatic engine control apparatus in the embodiment that represents, for each engine restarting condition, whether to stop the engine automatically again after the latest engine restart, for a case in which the vehicle speed is zero, and for a case in which the vehicle speed is over zero.

FIG. 6 is an example of a table used in the automatic engine control apparatus 10 in the embodiment that represents, for each engine restarting condition, whether to stop the engine automatically again after the latest engine restart, for a case in which the vehicle speed is zero, and for a case in which the vehicle speed is over zero.

In the automatic engine control apparatus 10 in the embodiment, for each of the engine restarting conditions to have the engine 12 restart, it is set in advance whether to permit the secondary automatic engine stop after the automatic engine restart with a satisfied latest restarting condition for a case in which the vehicle speed is zero, and for a case in which the vehicle speed is over zero.

For example, as illustrated in FIG. 6, among the restarting conditions, a requirement to be satisfied based on an operation on the brake pedal (brake pedal operation requirement); a requirement to be satisfied based on the slope of a road on which the vehicle is traveling (road surface slope requirement); a requirement to be satisfied based on the negative pressure of the brake booster (brake negative pressure requirement); and a requirement to be satisfied based on the brake master cylinder pressure (brake master cylinder pressure requirement), are defined as restarting conditions that permit the secondary automatic engine stop after a latest automatic engine restart for a case in which the vehicle speed is zero, and inhibit the secondary automatic engine stop after a latest automatic engine restart for a case in which the vehicle speed is not zero.

For example, the negative pressure of the brake booster of the vehicle is generated when the engine 12 operates. Thereupon, after having the engine restart by the satisfied brake negative pressure requirement as an engine restarting condition, to secure the brake performance of the vehicle while the vehicle speed is not zero, it is appropriate to inhibit the secondary automatic engine stop. On the other hand, if the vehicle speed is zero, the brake performance does not need to be secured, and it is appropriate to permit the secondary automatic engine stop to secure the function of the S&S control.

Also, among the restarting conditions, a requirement to be satisfied based on an operation on the steering wheel (steering operation requirement) is defined as a restarting condition that inhibits the secondary automatic engine stop after a latest automatic engine restart for a case in which the vehicle speed is zero, and permits the secondary automatic engine stop after a latest automatic engine restart for a case in which the vehicle speed is not zero.

For example, a steering operation while the vehicle is stopped is performed when the driver intends to start the vehicle. Thereupon, after having the engine restart by the satisfied steering operation requirement as an engine restarting condition, if the vehicle speed is zero, it is appropriate to inhibit the secondary automatic engine stop, to respect the driver's intention to start the vehicle. On the other hand, if the vehicle speed is not zero, it is appropriate to permit the secondary automatic engine stop to secure the function of the S&S control.

Also, among the restarting conditions, a requirement to be satisfied based on a detection of a diagnosis (diagnosis detection requirement) is defined as a restarting condition that inhibits the secondary automatic engine stop after a latest automatic engine restart both for a case in which the vehicle speed is zero, and for a case in which the vehicle speed is not zero. After having the engine restart by a diagnosis detection, it is appropriate to inhibit the secondary automatic engine stop to secure traveling safety both for a case in which the vehicle speed is zero, and for a case in which the vehicle speed is not zero.

Furthermore, among the restarting conditions, a requirement to be satisfied based on the cancel switch of the S&S control (cancel switch requirement) is defined as a restarting condition that permits the secondary automatic engine stop after a latest automatic engine restart both for a case in which the vehicle speed is zero, and for a case in which the vehicle speed is not zero. After having the engine restart by the turned-on cancel switch, if the cancel switch is turned off, it is appropriate to permit the secondary automatic engine stop to secure traveling safety both for a case in which the vehicle speed is zero, and for a case in which the vehicle speed is not zero, to respect the driver's intention to control having the engine 12 stop automatically by the S&S control.

Note that the restarting conditions to inhibit the secondary automatic engine stop after a latest automatic engine restart for a case in which the vehicle speed is not zero, may include a restarting condition that is different from the restarting conditions that permit the secondary automatic engine stop after a latest automatic engine restart for a case in which the vehicle speed is zero.

In the embodiment, the ECU 24 stores information representing the relationship illustrated in FIG. 6 in the ROM in advance. With reference to the relationship illustrated in FIG. 6, the ECU 24 determines whether a restarting condition satisfied most recently to have the engine 12 restart automatically at Step 214, is one of the restarting conditions that permit the secondary automatic engine stop.

If determining at Step 214 that the restarting condition satisfied most recently to have the engine 12 restart automatically, is not any of the restarting conditions that permit the secondary automatic engine stop (for example, if determining that it is the brake pedal operation requirement when the vehicle speed is not zero), the ECU 24 does not make a request for having the engine 12 stop automatically, to the engine ECU 28 (Step 204), and executes Step 200 again.

On the other hand, if determining at Step 214 that the restarting condition satisfied most recently to have the engine 12 restart automatically, is one of the restarting conditions that permit the secondary automatic engine stop (for example, if determining that it is the steering operation requirement when the vehicle speed is not zero), the ECU 24 starts executing the deceleration S&S control again, specifically, issues a command to the engine ECU 28 to have the engine 12 stop automatically at Step 208. In response to the automatic stop command, the engine ECU 28 issues a command to stop operations to the accessories such as the engine starter 20 and the fuel injection valves, to have the engine 12 stop automatically again.

After having the engine 12 stop automatically as described above, if determining that the engine restarting condition of the deceleration S&S control is satisfied, the ECU 24 issues a command to the engine ECU 28 to have the engine 12 restart automatically, to terminate the deceleration S&S control. In this case, the engine 12 is restarted automatically. Note that having the engine 12 restart automatically, the ECU 24 has a memory 30 store the engine restarting condition that has been satisfied when having the engine 12 restart automatically.

Also, if determining at Step 212 that the vehicle speed is zero, then, the ECU 24 determines whether the engine stop conditions other than that the vehicle speed is zero (referred to as the "other engine stop conditions" below) are satisfied (Step 216). Consequently, if determining that the other engine stop conditions are not satisfied, the ECU 24 determines that the engine stop conditions of the multi S&S control are not satisfied, and hence, does not make a request for having the engine 12 stop automatically, to the engine ECU 28 (Step 218), and executes Step 216 again.

If determining at Step 216 that the other engine stop conditions are satisfied, then, the ECU 24 determines whether to have the engine 12 stop automatically in response to the latest satisfied engine stop conditions with reference to the relationship illustrated in FIG. 6 (Step 220). Specifically, the ECU 24 reads the restarting condition satisfied most recently to have the engine 12 restart automatically that has been stored in the memory 30, and determines whether the latest engine restarting condition (the cause of the restart) to have the engine 12 restart automatically is one of those conditions that permit to have the engine 12 stop automatically.

If determining at Step 220 that the latest engine restarting condition to have the engine 12 restart automatically is not any of those conditions that permit to have the engine 12 stop automatically (for example, if determining that it is the steering operation requirement when the vehicle speed is zero), the ECU 24 does not make a request for having the engine 12 stop automatically, to the engine ECU (Step 218), and executes Step 216 again.

On the other hand, if determining at Step 220 that the latest engine restarting condition to have the engine 12 restart automatically is one of those conditions that permit to have the engine 12 stop automatically (for example, if determining that it is the brake pedal operation requirement when the vehicle speed is zero), the ECU 24 starts executing the multi S&S control, specifically, issues a command to the engine ECU 28 to have the engine 12 stop automatically (Step 222). In response to the automatic stop command, the engine ECU 28 issues a command to stop operations to the accessories such as the engine starter 20 and the fuel injection valves, to have the engine 12 stop automatically. Note that after having the engine 12 stop automatically at Step 222, the ECU 24 determines whether the engine restarting condition of the S&S control is satisfied, and repeatedly starts executing and terminates the S&S control.

Figure 7A:
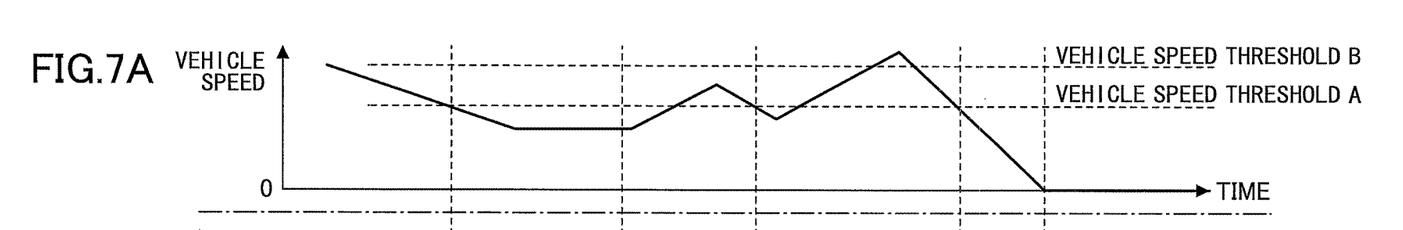
FIGS. 7A-7E are an example of an operational timing chart that is realized when controlling to have the engine stop automatically, depending on a restarting condition in the automatic engine control apparatus according to the embodiment.
Figure 7B:
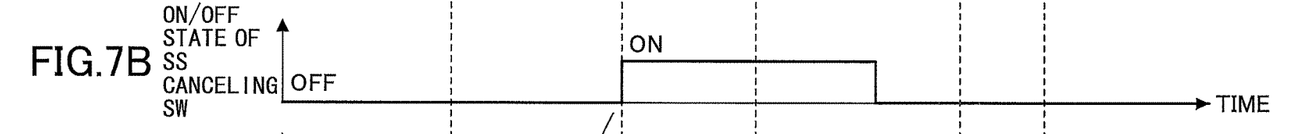
Figure 7C:
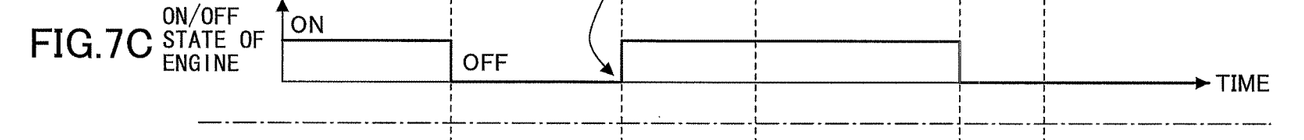
Figure 7D:
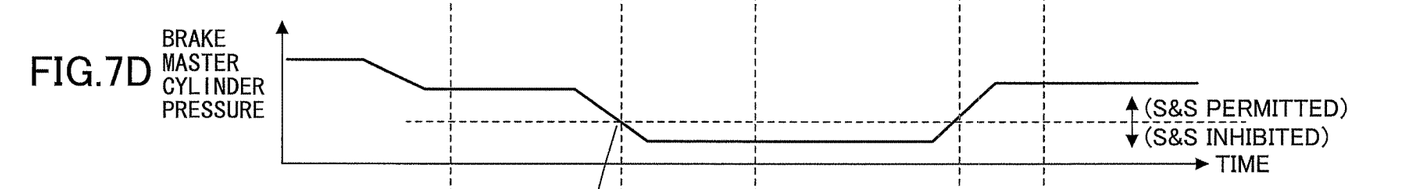
Figure 7E:
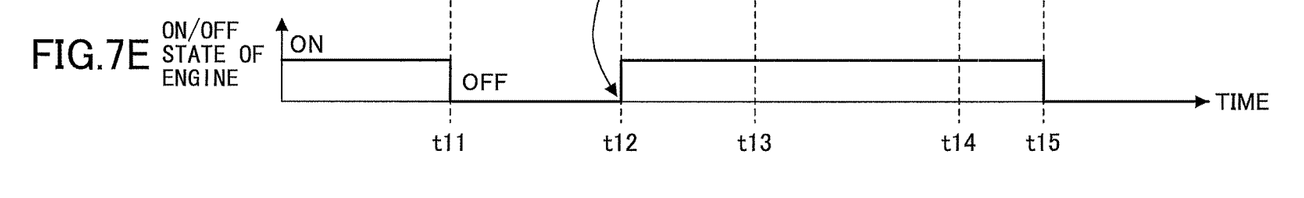

FIGS. 7A-7E are an example of an operational timing chart that is realized when controlling to have the engine 12 stop automatically, depending on restarting conditions including the vehicle speed and others in the automatic engine control apparatus 10 according to the embodiment. Note that FIG. 7A illustrates temporal change of the vehicle speed; FIG. 7B illustrates temporal change of on and off of the cancel switch of the S&S control; FIG. 7C illustrates temporal change of on and off of the engine 12 while the vehicle speed changes as illustrated in FIG. 7A and on and off of the cancel switch of the S&S control changes as illustrated in FIG. 7B (assuming that the other engine stop conditions are satisfied); FIG. 7D illustrates temporal change of the brake master cylinder pressure; and FIG. 7E illustrates temporal change of on and off of the engine 12 while the vehicle speed changes as illustrated in FIG. 7A and the brake master cylinder pressure changes as illustrated in FIG. 7D (assuming that the other engine stop conditions are satisfied).

For example, while the engine 12 is operating, on which execution of the deceleration S&S control is permitted, if the vehicle speed is reduced to be less than the predetermined vehicle speed A at time t11 as illustrated in FIG. 7A, to satisfy the engine stop conditions, the engine 12 is stopped automatically. Then, if the engine restarting condition is satisfied at time t12 as the cancel switch of the S&S control is turned on or the brake master cylinder pressure goes below a threshold pressure, the engine 12 is restarted automatically. After that, as long as the vehicle speed is not over the predetermined vehicle speed B, automatic stop of the engine 12 is not permitted even if the vehicle speed is less than the predetermined vehicle speed A, for example, at time t13.

The cancel switch requirement is a restarting condition that permits the secondary automatic engine stop after a latest automatic engine restart both for a case in which the vehicle speed is zero, and for a case in which the vehicle speed is not zero. Therefore, after having the engine 12 stop automatically, if the cancel switch of the S&S control is turned off as illustrated in FIG. 7B and the vehicle speed is over the predetermined vehicle speed B, and then, reduces to be less than the predetermined vehicle speed A at time t14, the ECU 24 starts executing the deceleration S&S control as illustrated in FIG. 7C to have the engine 12 stop automatically.

On the other hand, the brake master cylinder pressure requirement is a restarting condition that inhibits the secondary automatic engine stop after a latest automatic engine restart for a case in which the vehicle speed is zero, and permits the secondary automatic engine stop after a latest automatic engine restart for a case in which the vehicle speed is not zero. Therefore, after having the engine 12 stop automatically, when the brake master cylinder pressure is over the threshold pressure as illustrated in FIG. 7D and the vehicle speed is over the predetermined vehicle speed B, then, the automatic stop of the engine 12 is inhibited if the vehicle speed is not zero. However, when the vehicle speed is zero at time t15, the ECU 24 starts executing the multi S&S control as illustrated in FIG. 7E, to have the engine 12 stop automatically.

In this way, the automatic engine control apparatus 10 in the embodiment can permit or inhibit the secondary automatic engine stop in response to the engine stop conditions being satisfied while the vehicle is traveling, depending on a restarting condition to have the engine 12 restart automatically, satisfied after having had the engine 12 stop automatically by executing the deceleration S&S control with the satisfied engine stop condition.

In other words, the automatic engine control apparatus 10 can inhibit the secondary automatic engine stop in response to the engine stop conditions being satisfied while the vehicle is traveling at non-zero vehicle speed, if the satisfied restarting condition to have the engine 12 restart automatically, is one of the specific restarting conditions (specifically, the brake pedal operation requirement, the road surface slope requirement, the brake negative pressure requirement, the brake master cylinder pressure requirement, and the diagnosis detection requirement) among the restarting conditions.

Note that if the secondary automatic engine stop is inhibited while the vehicle is travelling as described above (based on the deceleration S&S control only, except for the secondary automatic engine stop after having the engine restart automatically with the diagnosis detection requirement as an engine restarting condition), the secondary automatic engine stop may be permitted if the vehicle is stopped (based on the multi S&S control).

Alternatively, the automatic engine control apparatus 10 can permit the secondary automatic engine stop in response to the engine stop conditions being satisfied while the vehicle is traveling at non-zero vehicle speed, if the satisfied restarting condition to have the engine 12 restart automatically, is a restarting condition other than the specific restarting conditions (specifically, the steering operation requirement, and the cancel switch of the S&S control requirement) among the restarting conditions. Specifically, the automatic engine control apparatus 10 can permit the secondary automatic engine stop in response to the engine stop conditions being satisfied, and only if the elapsed time after having the engine restart is greater than or equal to a predetermined time, and the number of times of restarting the engine is less than a predetermined number of times.

For example, after having the engine 12 restart automatically with the restarting condition of the brake master cylinder pressure requirement, if the vehicle speed is not zero, and the secondary automatic engine stop is executed in response to the engine stop conditions being satisfied, the brake performance may be reduced. Also, after having the engine 12 restart automatically with the restarting condition of the diagnosis detection requirement, if the vehicle speed is not zero, and the secondary automatic engine stop is executed in response to the engine stop conditions being satisfied, it may be impossible to have the engine 12 restart, depending on the cause of the diagnosis detection (for example, a disconnection), and traveling safety may be reduced.

In contrast to this, in the embodiment, the automatic engine control apparatus 10 can inhibit the secondary automatic engine stop in response to the engine stop conditions being satisfied while the vehicle is traveling, if the latest satisfied restarting condition to have the engine 12 restart automatically, is one of the specific restarting conditions (specifically, the brake pedal operation requirement, the road surface slope requirement, the brake negative pressure requirement, the brake master cylinder pressure requirement, and the diagnosis detection requirement) while the vehicle is travelling. In other words, the automatic engine control apparatus 10 can inhibit the secondary automatic engine stop, irrespective of the elapsed time after the restart and the number of times of engine restarting while the vehicle is travelling.

Therefore, the automatic engine control apparatus 10 in the embodiment can prevent the engine 12 from being stopped automatically again, after having the engine 12 stopped automatically, and then, having the engine 12 restart automatically with a satisfied one of the specific restarting conditions while the vehicle is traveling. Therefore, it is possible to avoid executing the secondary automatic engine stop after having the engine 12 restart automatically while the vehicle is traveling, contrary to the driver's intention, or when a diagnosis is detected with which the engine 12 should not be stopped.

Also, the automatic engine control apparatus 10 in the embodiment can permit or inhibit the secondary automatic engine stop in response to the engine stop conditions being satisfied while the vehicle is stopped, depending on a restarting condition to have the engine 12 restart automatically, satisfied after having had the engine 12 stop automatically by executing the multi S&S control with the satisfied engine stop condition.

Furthermore, for the same restarting condition, the secondary automatic engine stop may be permitted or inhibited differently by the deceleration S&S control that is executed while the vehicle is travelling (the vehicle speed is not zero), and by the multi S&S control that is executed while the vehicle is stopped (the vehicle speed is zero). For example, for the brake pedal operation requirement, the secondary automatic engine stop may be inhibited while the vehicle is travelling, whereas the secondary automatic engine stop may be permitted while the vehicle is stopped. Therefore, according to the embodiment, permission or inhibition of the secondary automatic engine stop after having the engine restart automatically, may be controlled appropriately in accordance with a state of the vehicle and/or the driver's intention.

Note that in the second embodiment, among the engine restarting conditions, specific restarting conditions including the brake pedal operation requirement, the road surface slope requirement, the brake negative pressure requirement, the brake master cylinder pressure requirement, and the diagnosis detection requirement, correspond to a "third restarting condition" described in the claims; the ECU 24 not executing Step 208 after obtaining a negative determination at Step 214 in the routine illustrated in FIG. 4, corresponds to an "electronic control unit" described in the claims.

In the second embodiment, as long as the vehicle speed is not over the predetermined threshold B after having the engine restart automatically, the deceleration S&S control does not execute the secondary automatic engine stop even if the engine stop conditions that include the vehicle speed being less than the predetermined threshold A are satisfied. However, the embodiment is not limited to that, but for a certain case (for example, the engine restarting condition satisfied when having the engine restart automatically is the cancel switch requirement), the secondary automatic engine stop may be executed if the engine stop conditions are satisfied that include the vehicle speed being less than the predetermined threshold A even if the vehicle speed is not over the predetermined threshold B after having the engine restart automatically.

Also, in the second embodiment, when the vehicle speed is not zero, or the vehicle speed is zero, the restarting conditions that inhibit the secondary automatic engine stop, and the restarting conditions that permit the secondary automatic engine stop after a latest automatic engine restart, are set as illustrated in FIG. 6. However, the embodiment is not limited to that, but other requirements may be included as restarting conditions that inhibit the secondary automatic engine stop, and as restarting conditions that permit the secondary automatic engine stop when the vehicle speed is not zero, or the vehicle speed is zero.

The invention claimed is:

1. An automatic engine control apparatus installed in a vehicle, configured to have an engine of the vehicle stop automatically when a predetermined stop condition is satisfied, and after automatically stopping the engine, to have the engine restart automatically when a predetermined restarting condition is satisfied, the apparatus comprising:

an electronic control unit configured to inhibit, while the vehicle is stopped, a second automatic stop of the engine in response to the predetermined stop condition being satisfied when the predetermined restarting condition satisfied most recently to have caused the engine to restart automatically was a first restarting condition, or to permit the second automatic stop of the engine in response to the predetermined stop condition being satisfied when the predetermined restarting condition satisfied most recently to have caused the engine to restart automatically was a second restarting condition different from the first restarting condition, wherein the first restarting condition represents an intention of a driver of the vehicle to start moving the vehicle.

2. The automatic engine control apparatus as claimed in claim 1, wherein the first restarting condition that represents the intention of the driver to start moving the vehicle is a steering operation or an acceleration operation by the driver.

3. The automatic engine control apparatus as claimed in claim 1, wherein while the vehicle is traveling, the electronic control unit inhibits the automatic stop of the engine in response to the predetermined stop condition being satisfied when the predetermined restarting condition that was satisfied most recently to have caused the engine to restart automatically was a third restarting condition.

4. The automatic engine control apparatus as claimed in claim 3, wherein the electronic control unit permits the automatic stop of the engine in response to the predetermined stop condition being satisfied when the third restarting condition was satisfied while the vehicle was stopped.

5. The automatic engine control apparatus as claimed in claim 3, wherein the third restarting condition is a condition different from the first restarting condition.

6. The automatic engine control apparatus as claimed in claim 2, wherein the second restarting condition is one or more of an air conditioning requirement, a battery charging requirement and a shift operation requirement.

7. The automatic engine control apparatus as claimed in claim 3, wherein the third restarting condition is one or more of a braking operation requirement, a road surface slope requirement, a brake negative pressure requirement and a brake master cylinder requirement.

* * * * *